United States Patent
Wang

(10) Patent No.: US 6,708,646 B1
(45) Date of Patent: Mar. 23, 2004

(54) COOLING PAD FOR PETS

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 10/413,283

(22) Filed: Apr. 15, 2003

(51) Int. Cl.7 .............................................. A01K 1/015
(52) U.S. Cl. ...................... 119/28.5; 119/421
(58) Field of Search ..................... 119/28.5; 5/417, 5/421, 420, 658

(56) References Cited

U.S. PATENT DOCUMENTS

| | | | | |
|---|---|---|---|---|
| 2,866,066 A | * | 12/1958 | Neely | 219/536 |
| 4,064,835 A | * | 12/1977 | Rabenbauer | 119/28.5 |
| 4,899,693 A | * | 2/1990 | Arnold | 119/28.5 |
| 5,311,837 A | * | 5/1994 | Mamer-Boellstorff | 119/28.5 |
| 5,448,788 A | * | 9/1995 | Wu | 5/421 |
| 5,555,579 A | * | 9/1996 | Wu | 5/421 |
| 6,084,209 A | * | 7/2000 | Reusche et al. | 219/217 |
| 6,114,014 A | * | 9/2000 | Ikeda et al. | 428/192 |
| 6,237,531 B1 | * | 5/2001 | Peeples et al. | 119/28.5 |
| 6,589,631 B1 | * | 7/2003 | Suzuki et al. | 428/172 |

FOREIGN PATENT DOCUMENTS

GB     2240251     *  7/1991

* cited by examiner

Primary Examiner—Yvonne Abbott
(74) Attorney, Agent, or Firm—Troxell Law Office PLLC

(57) ABSTRACT

A cooling pad for pets and particularly a novel cooling pad aims at overcoming the disadvantage of poor heat dissipation occurred to conventional cooling pads that are in close contact with the ground surface. It includes a base which has an upper surface forming bulged ribs to hold a cooling pad body and form an upper space, and a bottom surface having ridges connecting to bulged peripheral rims of the base to be in contact with the ground surface and with the rest areas forming an indented lower space. An anchor frame is provided that has a loop of retaining flange to couple with the cooling pad body and the base. The cooling pad body is spaced from the ground surface through the upper space and the lower space to facilitate heat dissipation and provide the pets a comfortable lying environment. In addition, the rough edges of the cooling pad body are covered to protect the pets from injury.

4 Claims, 4 Drawing Sheets

COOLING PAD FOR PETS

BACKGROUND OF THE INVENTION

1. Field of the Invention

The invention relates to a cooling pad for pets to facilitate heat dissipation of pets and prevent the pets from being injured by the rough edges of the cooling pads.

2. Description of the Prior Art

Conventional cooling pads for pets such as the one shown in FIG. 1 generally are made of an aluminum sheet that are laid on the floor to provide a neat lying space for pets.

Another purpose of the pads is to form from materials that have a better heat dissipating property thereby to facilitate cooling of the pets that are bought from the frigid region to the tropical region or subtropical region so that they may feel more comfortable when lying on the pads without getting irritated.

However, the conventional pads for pets mentioned above are in close contact with the floor when laid. There is no space for air convection to disperse heat. Hence even if the pad is made from materials of a good heat dissipation efficiency, the cooling effect is still limited. No space for convection to disperse heat is the biggest shortcoming.

Moreover, the cooling pad 10 usually has rough and sharp edges. In the situation that the edges are directly exposed, they are prone to hurt the pets incidentally. This is another shortcoming.

SUMMARY OF THE INVENTION

In view of the aforesaid disadvantages, the primary object of the invention is to provide an improved cooling pad for pets that is spaced from the floor when laid to form a desirable heat dissipation space to improve convection efficiency and facilitate heat dissipation.

Another object of the invention is to provide a cooling pad for pets that has the peripheral edges covered by a protective rim to prevent the pets from being injured by the rough edges.

To achieve the foregoing objects the invention mainly includes a base, a cooling pad body and an anchor frame. The anchor frame has retaining flanges for holding the cooling pad body. Then the anchor frame and the cooling pad body are mounted and coupled on the base with stubs located on the retaining flanges to engage with insert holes formed on the surface of the base, and the surface of the base has ribs to support the cooling pad body such that the surface of the base and the cooling pad body form an desirable upper space while the bottom surface of base has ridges connecting to peripheral bulged rims to contact the ground surface to provide support needed. The rest areas besides the ridges form a lower space. By means of such a structure, a convection space is formed to provide fast heat dissipation between the cooling pad and the ground surface. The peripheral rough edges of the cooling pad body also are covered to avoid injuring the pets.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
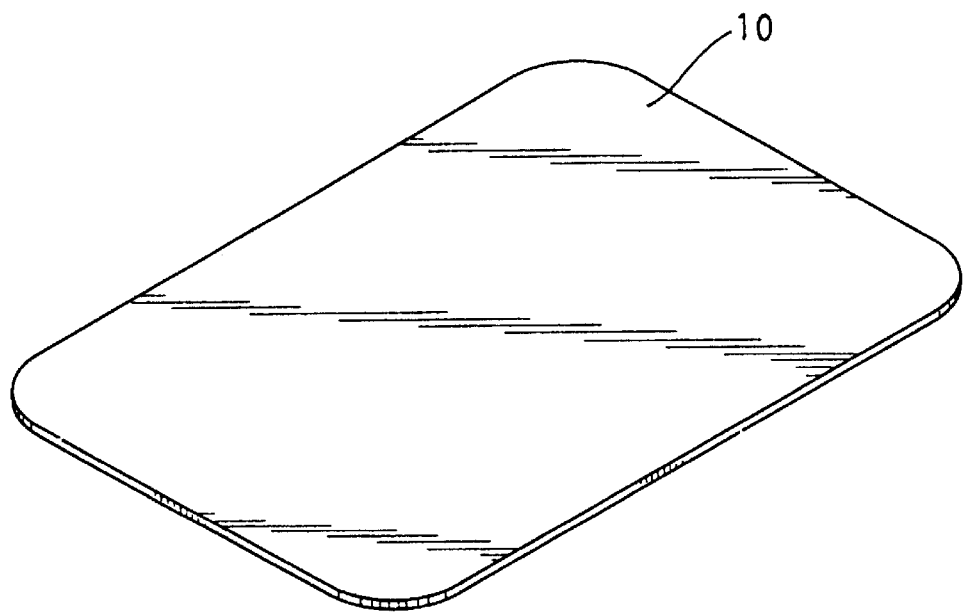
FIG. 1 is a perspective view of a conventional cooling pad for pets.
Figure 2:
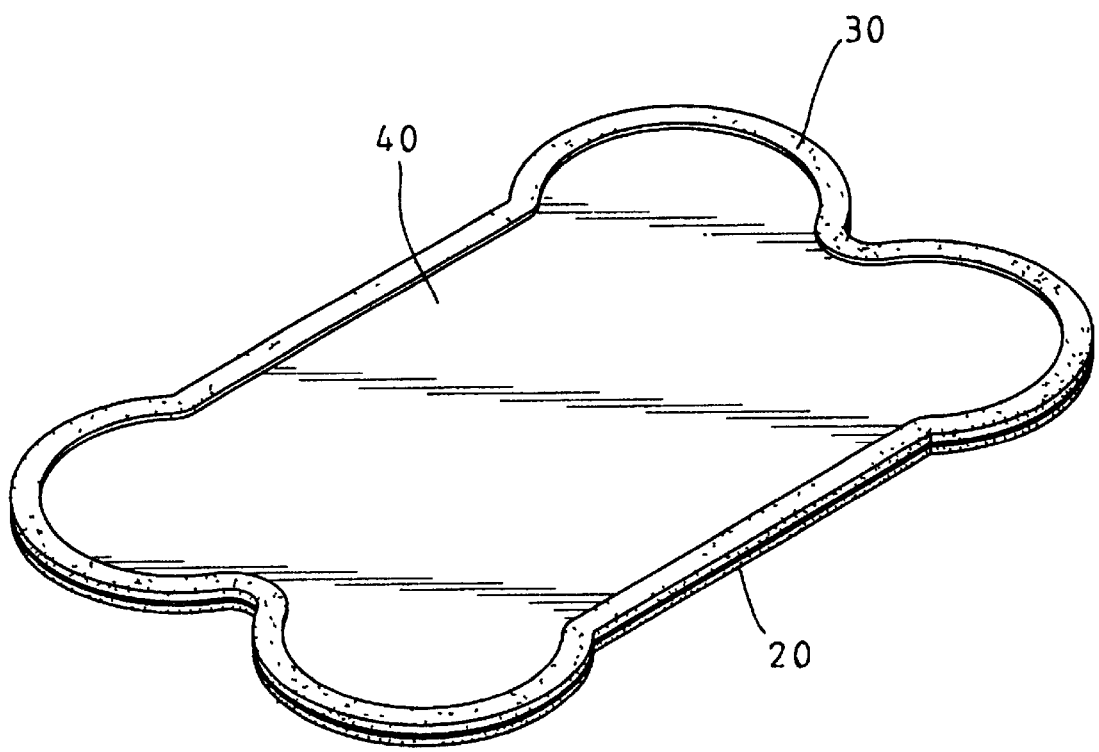
FIG. 2 is a perspective view of the invention.
Figure 3:
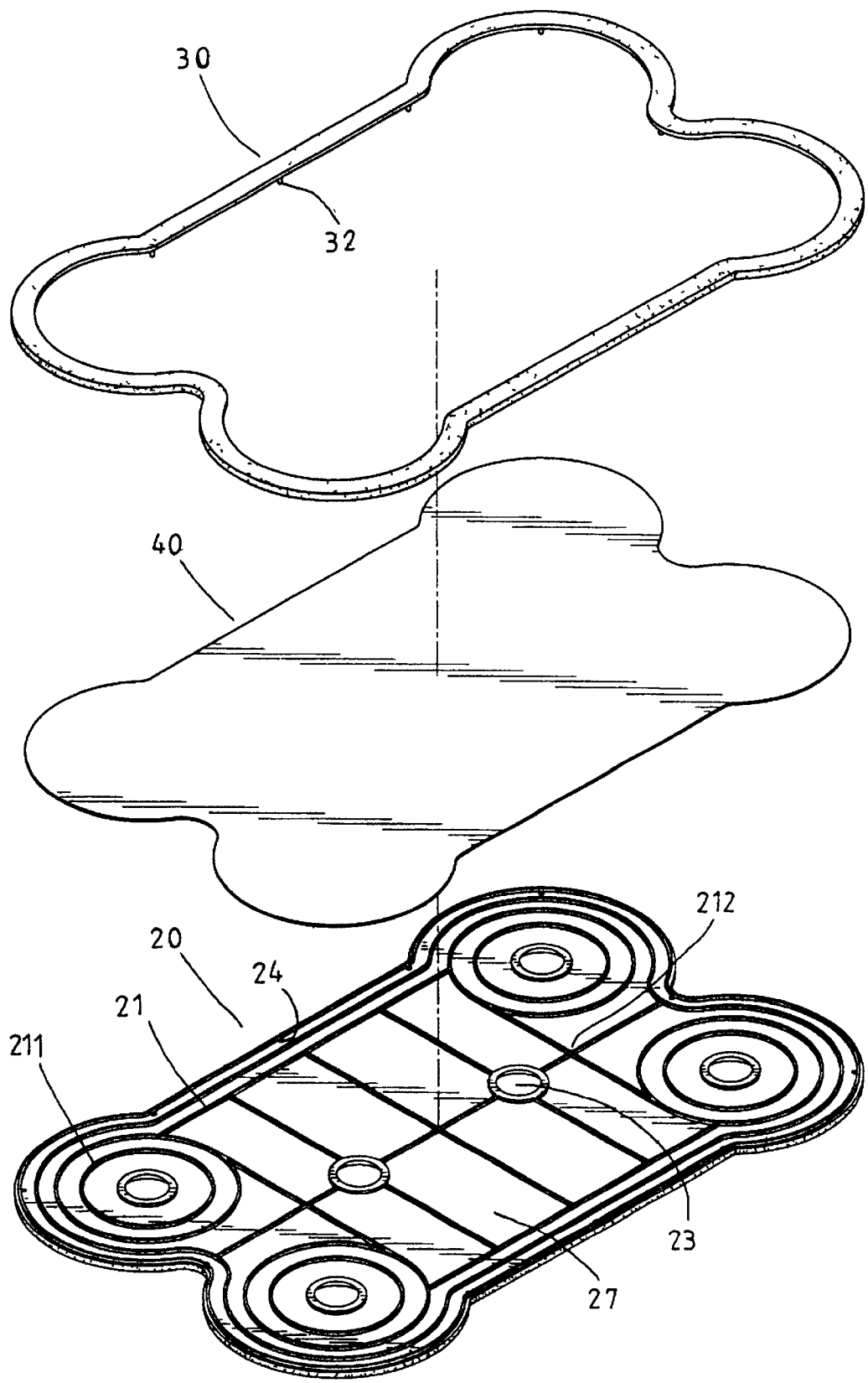
FIG. 3 is an exploded view of the invention.
Figure 4:
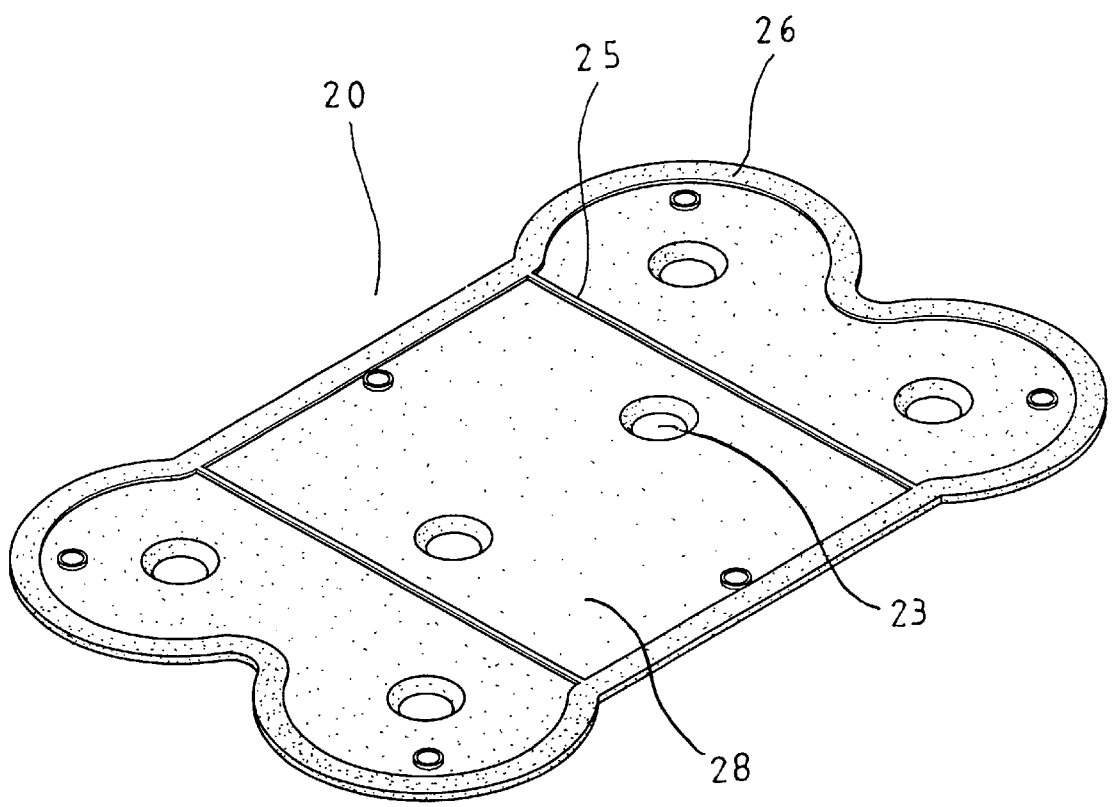
FIG. 4 is a perspective view of the bottom surface of the base of the invention.

Referring to FIGS. 2, 3 and 4, the invention mainly includes a base 20 and an anchor frame 30 coupling with the base 20 for holding a cooling pad body 40.

The base 20 has an upper surface forming bulged ribs 21. The ribs 21 include a plurality of annular ribs 211 on the periphery and cross ribs 212 in the center for holding the cooling pad body 40 so that the surface of the base 20 and the cooling pad body 40 form a desired upper space 27 therebetween. The base 20 further has at least one opening 23 and at least two insert holes 24 formed on the surface at the inner side around the peripheral rim. The bottom surface of the base 20 has bulged ridges 25 connecting to the bulged peripheral rim 26 that are in contact with the ground surface to provide support. The rest areas other than the ridges form an indented lower space 28.

The anchor frame 30 has a loop of retaining flange 31 formed on the lower peripheral rim mating the shape of the cooling pad body 40 for holding the cooling pad 40. The bottom side of the retaining flange 31 has at least two insert stubs 32 directing downwards and corresponding to the insert holes 24 of the base 20 for coupling with each other.

The cooling pad body 40 is made of a metal sheet (such as aluminum sheet).

Figure 5:
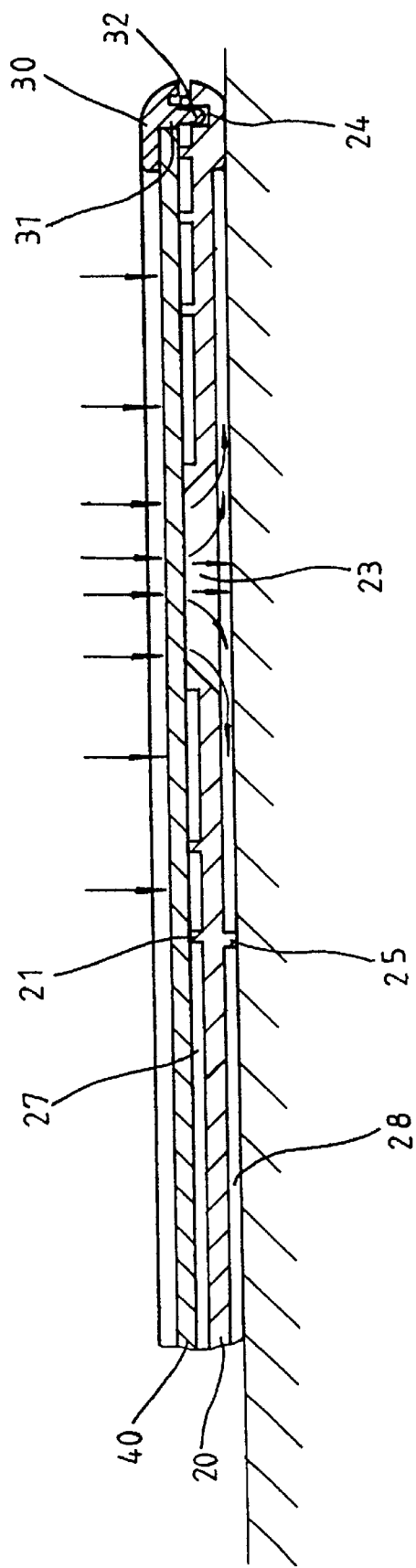
FIG. 5 is a fragmentary cross section of the invention.

By means of the elements set forth above, the cooling pad body 40 may be wedged in the retaining flange 31 of the anchor frame 30; then the coupled anchor frame 30 and the cooling pad body 40 may be mounted onto the base 20 with the insert stubs 32 of the retaining flange 31 coupling into the insert holes 24 of the base 20 to complete the assembly as shown in FIG. 5.

Referring to FIGS. 4 and 5, the coupling of the cooling pad body 40 and the anchor frame 30 is accomplished by engaging the insert stubs 32 of the anchor frame with the insert holes 24 of the base 20, thereby the cooling pad body 40 may be anchored. In addition, the ribs 21 on the surface of the base 20 supports the cooling pad body to provide the upper, space 27 between the surface of the base 20 and the cooling pad body. The ridges 25 on the bottom surface of the base connecting to the bulged peripheral rims 26 are in contact with the ground surface to provide support and form the indented lower space 28. Thus the cooling pad 40 is spaced from the ground surface through the upper space 27 and the lower space 28 to form a space to facilitate heat dissipation. The openings 23 further enable the upper space 27 to communicate with the lower space 28 to accelerate heat dissipation from the pets to the ground surface as shown by arrows in the drawings.

By means of the construction set forth above, the cooling pad of the invention provides a heat dissipation space that can accelerate heat dissipation and enhance cooling efficiency. The peripheral edges of the pad are covered to protect the pets from being injured by the rough edges of the bare cooling pad.

While the preferred embodiment of the invention has been set forth for the purpose of disclosure, modifications of the disclosed embodiment of the invention as well as other embodiments thereof may occur to those skilled in the art.

Accordingly, the appended claims are intended to cover all embodiments which do not depart from the spirit and scope of the invention.

I claim:

1. A cooling pad for pets comprising a base, a cooling pad body held on the base and an anchor frame coupling and retaining the peripheral rim of the cooling pad body;

wherein the base has an upper surface which has bulged ribs formed thereon to support the cooling pad body and form said upper surface, and a bottom surface which has ridges connecting to bulged peripheral rims thereof to be in contact with ground surface and the rest areas of the bottom surface forming an indented lower space, the anchor frame having a retaining flange to couple the cooling pad body, the coupled anchor frame and the cooling pad body being mounted onto the base such that the cooling pad body is spaced from the ground surface through the upper space and the lower space to facilitate heat dissipation.

2. The cooling pad for pets of claim 1, wherein the base has at least one opening to allow the upper space to communicate with the lower space.

3. The cooling pad for pets of claim 1, wherein the retaining flange of the anchor frame is an annular loop located on a lower surface of the anchor frame mating the shape of the cooling pad body for retaining the cooling pad body.

4. The cooling pad for pets of claim 3, wherein the retaining flange has at least two insert stubs directing downwards and corresponding to and insertable into insert holes formed on the surface of the base for coupling the anchor frame on the base.

* * * * *